US008793457B2

(12) United States Patent
Cannon et al.

(10) Patent No.: US 8,793,457 B2
(45) Date of Patent: Jul. 29, 2014

(54) METHOD AND SYSTEM FOR POLICY-BASED SECURE DESTRUCTION OF DATA

(75) Inventors: David Maxwell Cannon, Tucson, AZ (US); Toby Lyn Marek, Santa Clara, CA (US); Mark Alan Haye, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 1226 days.

(21) Appl. No.: 11/625,740

(22) Filed: Jan. 22, 2007

(65) Prior Publication Data

US 2008/0177811 A1 Jul. 24, 2008

(51) Int. Cl.
*G06F 21/00* (2013.01)

(52) U.S. Cl.
USPC .......................................... 711/163; 711/112

(58) Field of Classification Search
CPC ................. G06F 2221/2143; G06F 17/30085; G06F 2003/0697; G06F 21/64; G06F 21/805; G06F 3/0601; G06F 21/6218; G06F 17/30138; G11B 7/0055; G11B 7/006; G11B 20/00666
See application file for complete search history.

(56) References Cited

U.S. PATENT DOCUMENTS

| | | | | |
|---|---|---|---|---|
| 5,748,084 A * | 5/1998 | Isikoff | ........................ | 340/568.1 |
| 6,189,446 B1 | 2/2001 | Olliges et al. | ....................... | 101/6 |
| 6,679,444 B2 | 1/2004 | Castronovo | ................ | 241/101.2 |
| 6,685,119 B2 | 2/2004 | Castronovo | ................ | 241/260.1 |
| 2006/0010301 A1* | 1/2006 | Yagawa | ......................... | 711/163 |
| 2006/0015944 A1* | 1/2006 | Fields | ............................... | 726/27 |
| 2006/0106880 A1* | 5/2006 | Wang et al. | .................... | 707/200 |
| 2007/0101055 A1* | 5/2007 | Thorsen | ......................... | 711/112 |
| 2007/0233606 A1* | 10/2007 | Zweig et al. | ..................... | 705/57 |
| 2007/0294499 A1* | 12/2007 | Garthwaite | .................... | 711/170 |

FOREIGN PATENT DOCUMENTS

DE 202005002351 2/2005 ............... G11B 7/55

OTHER PUBLICATIONS

Davis, Peter T., "Data Management: Data Destruction and Preservation, Part 1", EDPACS the EDP Audit Control and Security Newsletter, Sep. 2003, vol. 31, No. 3.
Davis, Peter T., "Data Management: Data Destruction and Preservation, Part 2", EDPACS the EDP Audit Control and Security Newsletter, Oct. 2003, vol. 31, No. 4.
Hasan, Ragib et al., "Toward a Threat Model for Storage Systems", ACM Digital Library, Nov. 11, 2005.
Burns, Randal et al., "Verifiable Audit Trails for a Versioning File System", ACM Digital Library, Nov. 11, 2005.

* cited by examiner

*Primary Examiner* — Michael S McNally
*Assistant Examiner* — Carlton Johnson
(74) *Attorney, Agent, or Firm* — Kunzler Law Group

(57) ABSTRACT

An apparatus, system, and method are disclosed for policy-based secure destruction of data. The method for policy-based secure destruction of data is provided. In one embodiment, the method includes storing a data destruction policy, wherein the data destruction policy defines at least one predetermined data destruction parameter. The method may also include referencing the data destruction policy to obtain the data destruction parameters in response to a predetermined data operation. In a further embodiment, the method may include executing a data destruction process in accordance with the data destruction parameters.

16 Claims, 6 Drawing Sheets

METHOD AND SYSTEM FOR POLICY-BASED SECURE DESTRUCTION OF DATA

FIELD OF THE INVENTION

This invention relates to secure data destruction and more particularly relates to policy-based secure destruction of data.

DESCRIPTION OF THE RELATED ART

A typical storage-management software application provides a repository for computer information. Stored computer information may include backup data from client servers and workstations. One example of a typical storage-management application is Tivoli® Storage Manager (TSM) available from International Business Machines® (IBM®). In such an example, TSM may provide a repository for computer information that is backed up, archived, or migrated from client servers or workstations in a network.

A storage-management server, such as TSM, stores computer information in the form of data objects. The data objects are typically stored in one or more storage pools. The storage-management server may utilize a database for tracking metadata about data objects stored in the pools. The storage-management server also typically performs several operations on the stored data objects, such as copy, move, or delete operations. For example, stored data objects may be deleted from the storage-management server by manual administrative action or automatically, based on retention rules.

When a typical storage-management server deletes a data object from its repository, metadata pertaining to that object is deleted from the database. This operation is commonly referred to as logical deletion, because the data is not readily accessible without the corresponding metadata. Similarly, when moving a data object to another storage location, the storage-management server updates the database to show the new location, thereby logically deleting the object from the previous location. Once a data object has been logically deleted, that data object is not readily accessible because metadata references no longer exist to point to the location or locations at which the data object is stored.

Logical deletion may present a security risk because the data is still physically present in its original location until it is overwritten by some other data. Although the data is not readily accessible, the residual physical data may potentially be reconstructed, which could introduce an unacceptable security risk in certain Information Technology (IT) environments. For such environments, secure destruction of data is a requirement, meaning not only that metadata references must be removed from the database, but also that the data object itself must be physically overwritten to render that data unreadable. Such destruction through overwriting data is commonly referred to as data shredding.

In an attempt to remedy this security risk, some systems may shred all data unconditionally. However, there may be several circumstances wherein unconditional destruction of data is impractical or undesirable. For example, since destruction of data via overwriting requires computer resources, such as memory, processor, or storage device resources, unconditional data destruction may be undesirable in systems with limited resources. Storage devices may have differing needs or capabilities for data shredding, depending on the performance, physical security or technology of the storage device. Additionally, data shredding typically eliminates the possibility of recovery in the event of inadvertent deletion. Even if the database is restored to an earlier state, metadata references to storage locations containing shredded data objects are typically not usable. Moreover, the shredding requirements may be different for different types of data objects. For example, highly sensitive data objects may have different shredding requirements than less sensitive data objects.

What is needed is an automatic, configurable mechanism for controlling whether data objects should be shredded after delete or move operations, and the parameters pertaining to that destruction.

SUMMARY OF THE INVENTION

The present invention has been developed in response to the present state of the art, and in particular, in response to the problems and needs in the art that have not yet been fully solved by currently available storage management systems. Accordingly, the present invention has been developed to provide an apparatus, system, and method for policy-based secure destruction of data that overcome many or all of the above-discussed shortcomings in the art.

The method for policy-based secure destruction of data is provided. In one embodiment, the method includes storing a data destruction policy, wherein the data destruction policy defines at least one predetermined data destruction parameter. The method may also include referencing the data destruction policy to obtain the data destruction parameters in response to a predetermined data operation. In a further embodiment, the method may include executing a data destruction process in accordance with the data destruction parameters.

In various embodiments of the method, the data destruction policy may include an identification parameter for identifying data objects that will be destroyed after these objects have been logically deleted or moved to another storage location. The data destruction policy may also include a timing parameter for determining when the data destruction process is to initiate. Additionally, the data destruction policy may include a bit pattern parameter for identifying a predetermined bit pattern to be utilized by the data destruction process. In a further embodiment, the data destruction policy may include a repeat parameter configured to trigger the data destruction process to overwrite the data object a predetermined number of times.

In a further embodiment of the method, the data destruction process may include validating a data object prior to destroying the object, wherein validating includes comparing a header value of the data object with an expected data object header value. The data destruction process may further include overwriting the data object header with a predetermined dummy header, overwriting the data object in accordance with the data destruction parameter, and repeating the overwrite of the data object in accordance with the data destruction parameter.

In a further embodiment, the method may include auditing a selected storage volume to determine whether the data destruction policy has been applied. Auditing may include determining whether the data object header values associated with data objects match expected data object header values.

A system is also presented for policy-based secure destruction of data. In one embodiment, the system includes storage server configured to store a data destruction policy, wherein the data destruction policy defines at least one predetermined data destruction parameter, reference the data destruction policy to obtain the data destruction parameters in response to a predetermined data operation, and execute a data destruction process in accordance with the data destruction parameters The system may also include a storage medium in communication with the storage server and configured to store data objects for the storage server.

An apparatus is also presented for policy-based destruction of data. In one embodiment, the apparatus is configured with a plurality of modules configured to carry out the steps of the method. For example, the apparatus may include a memory configured to store a data destruction policy, wherein the data destruction policy defines predetermined data destruction parameters. The apparatus may also include a referencing module configured to reference the data destruction policy to obtain the data destruction parameter in response to a predetermined data operation. Furthermore, the apparatus may include a processor configured to execute a data destruction process in accordance with the data destruction parameter.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
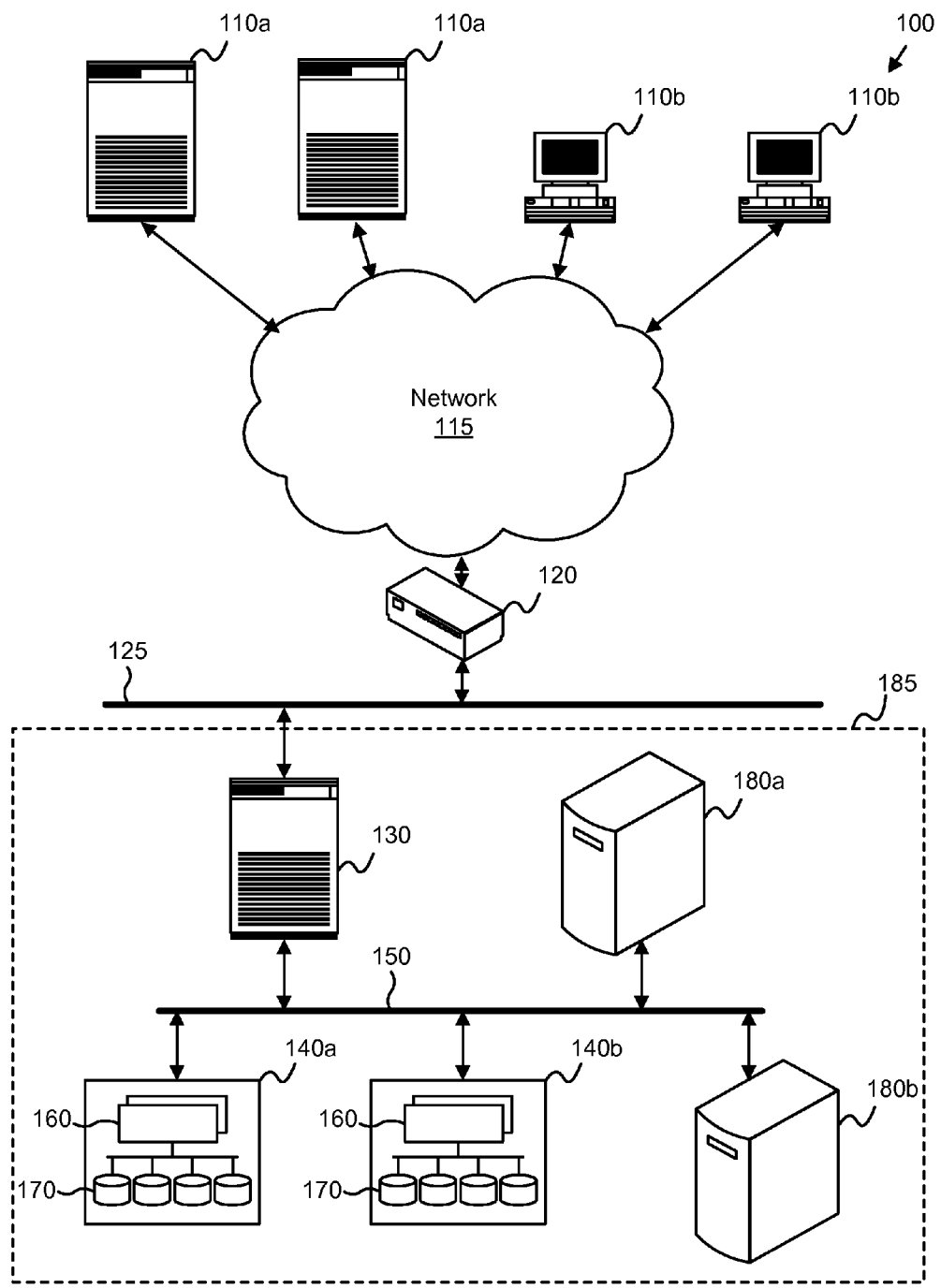
FIG. 1 is schematic block diagram illustrating one embodiment of a system for policy-based secure data destruction.

FIG. 1 is a schematic block diagram illustrating one embodiment of a data processing system (DPS) 100. The DPS 100 includes one or more client servers 110a, one or more client computers 110b, a network 115, a router 120, an internal network 125, and a storage management system 185. The storage management system 185 may include a storage server 130, a storage communications channel 150, one or more storage subsystems 140, and one or more tape drives 180. The storage communications channels 150 could be a Storage Area Network (SAN), Small Computer System Interface (SCSI) bus, or other type of channel.

As used herein, the client servers 110a and client computers 110b are referred to as clients 110. The server 130 may also be configured as a mainframe computer, a blade center comprising multiple blade servers, and the like. Although for simplicity four clients 110, one network 115, one router 120, one internal network 125, one storage server 130, one storage communications channel 150, two storage subsystems 140, and two tape drives 180 are shown, any number of clients 110, networks 115, routers 120, internal networks 125, servers 130, storage communications channels 150, storage subsystems 140, and tape drives 180 may be employed. One of skill in the art will also readily recognize that the DPS 100 could include other data processing devices such as bridges, scanners, printers, and the like.

Each storage subsystem 140 includes one or more storage managers 160 and one or more storage devices 170. The storage devices 170 may be hard disk drives, optical storage devices, micromechanical storage devices, holographic storage devices, and/or semiconductor storage devices. The tape drives 180 may store data to and retrieve data from magnetic tapes. The tape drives 180 may be stand-alone tape drives 180. Alternatively, the tape drives 180 may be embodied in a tape library.

Data objects may be generated by software application on the clients 110. Such software objects may be backed up, archived, or migrated to the storage management system 185. For example, the data objects may be stored across one or more storage devices 170 within a storage subsystem 140. Alternatively, the data objects may be stored on a storage tape within the tape drive 180. In certain embodiments, the clients 110, the storage server 130, or the storage manager 160 may generate a request to move or delete data objects on the storage devices 170 or the tape drives 180. For example the storage server 130 may initiate an operation to move data objects from the storage devices 170 to the tape drive 180 for archival. In such an embodiment, the storage server 130 may detect the move operation and automatically check data destruction policies to determine if the physical data left on the storage device 170 should be shredded. The storage server 130 may then automatically shred the data by executing a data destruction process. The data destruction policies and process are discussed in further detail below.

Figure 2:
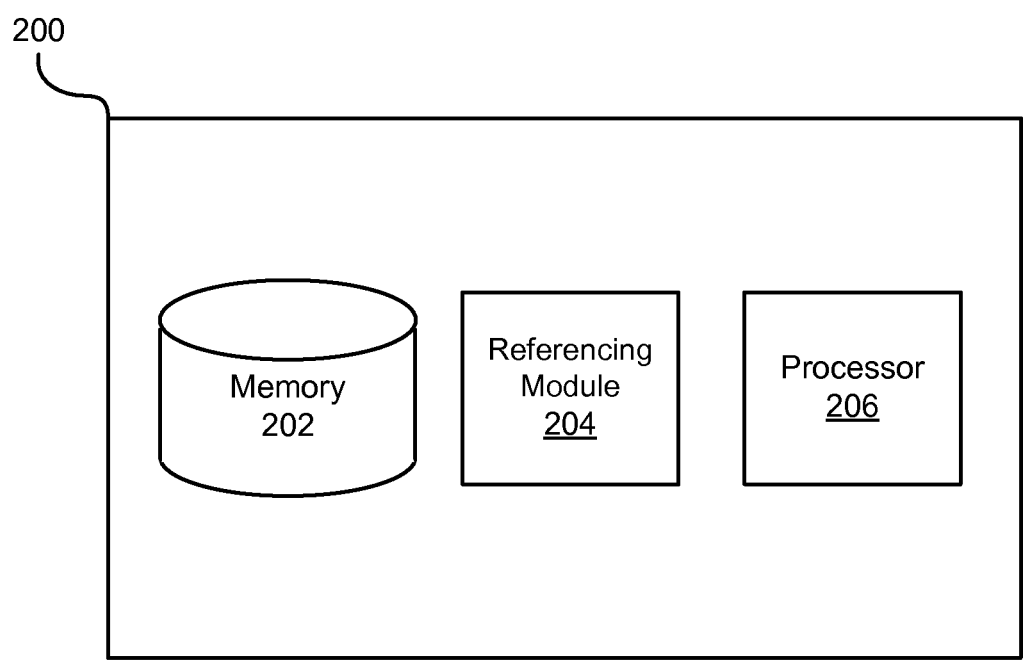
FIG. 2 is a schematic block diagram illustrating one embodiment of an apparatus for policy-based secure data destruction.

FIG. 2 illustrates one embodiment of an apparatus 200 for policy-based secure destruction of data. In one embodiment, the apparatus 200 may operate on the storage server 130. In an alternative embodiment, the apparatus may operate on the storage subsystem 140 and in conjunction with the storage manager 160 or storage server 130. The apparatus 200 may also be a discrete component of the storage communications channel 150. In another embodiment, the apparatus 200 may be embodied as a non-transitory computer readable medium configured with a set of computer readable operations executable by a processor on the storage subsystem 140 or the storage server 130. The apparatus 200 may include a memory 202, a referencing module 204, and a processor 206.

In one embodiment, the memory 202 may store a data destruction policy that defines one or more data destruction parameters. The memory 202 may include a Random Access Memory (RAM), a removable flash memory, a hard disk, or a remote data repository. The memory 202 may be accessible by the referencing module 204, the processor 206, or both.

In response to a move or delete operation, the referencing module 204 may reference the data destruction policy to obtain one or more data destruction parameters. The referencing module 204 may then pass the data destruction parameters to a data destruction process. In one embodiment, a data destruction parameter may be an indicator of whether or not the data should be destroyed. In one embodiment, the referencing module 204 may generate requests for the data destruction process in response to information from the data destruction parameters. In certain embodiments, the referencing module 204 may include a memory interface or bus interface for accessing the location in memory 202 where the data destruction policy is stored. The referencing module 204 may be a discrete physical component of the apparatus 200. Alternatively, the referencing module 204 may be implemented in software or firmware which may be executed by the processor 206 in conjunction with execution of the data destruction process.

The processor 206 may execute a data destruction process in accordance with the data destruction policy. The data destruction process may alternatively be referred to as a data shredding process. The terms data destruction process and data shredding process may be used interchangeably. For example, if the data destruction policy accessed by the referencing module 204 includes an indicator that a given data object should be shredded, the referencing module 204 may trigger the processor 206 to execute a data shredding process on the identified data object. In one embodiment, the processor 206 may be the processor of the storage server 130. The processor 206 used for data destruction may be the main processor used for other data operations in the storage server 130. Alternatively, an auxiliary processor 206 may be employed to exclusively handle data shredding operations.

Figure 3A:
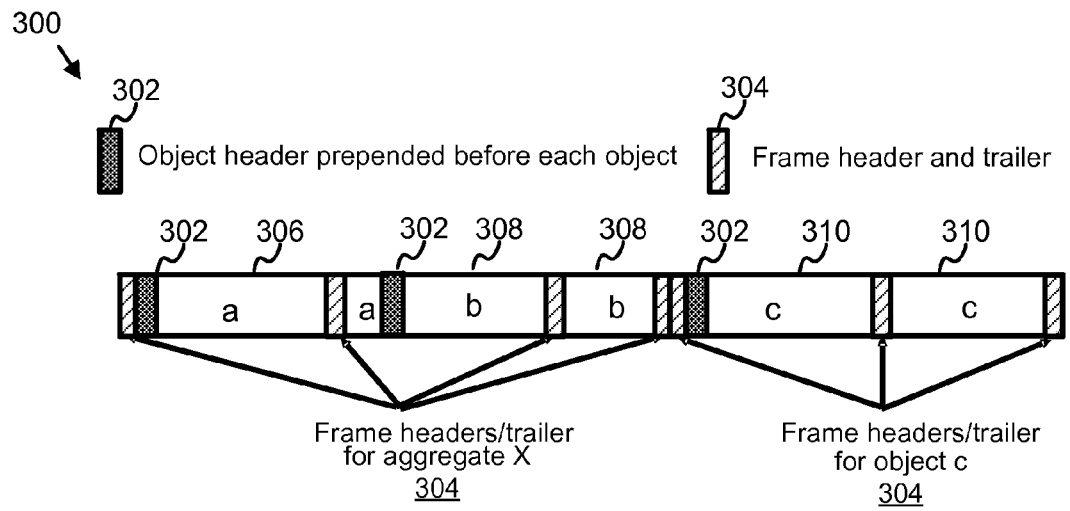
FIG. 3A is a logical diagram illustrating one embodiment of a data storage configuration.

FIG. 3A is a logical block diagram illustrating one embodiment of a format for storing data on a storage device 170. In the depicted embodiment, the stored data is divided into frames, and frame headers 304 separate the frames. The data object is stored with an object header 302. In one embodiment, the object header 302 contains metadata for identifying the data object. A single data object may be stored across multiple frames or even across multiple storage devices 170. Frame headers 304 separate frames. In a certain embodiment, multiple data objects may be aggregated. In such an embodiment, the aggregate may end in a frame trailer 304.

In the depicted example, aggregate 'X' includes data object 'a' 306 and data object 'b' 308. The aggregate 'X' starts with a frame header 304. Data object 'a' 306 starts with an object header 302 which contains metadata relating to data object 'a.' Since data object 'a' 306 is larger than one frame of data, data object 'a' 306 may be interrupted by a frame header 304. The end of data object 'a' 306 and the beginning of data object 'b' 308 is separated by the object header 302 for data object 'b' 308. Since the end of data object 'b' 308 is the end of the aggregate 'X,' the aggregate 'X' ends with a frame trailer 304. The next frame begins with a frame header 304 followed by the object header 302 for data object 'c' 310. Data object 'c' 310 covers two frames and ends with a frame trailer 304.

Figure 3B:
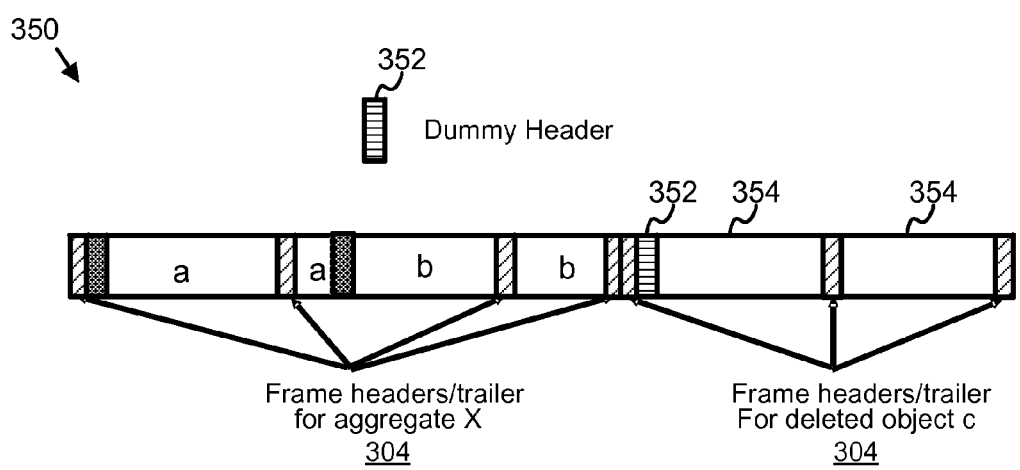
FIG. 3B is a logical diagram illustrating one embodiment of a data storage configuration including shredded data.

FIG. 3B illustrates one embodiment of the same volume of storage 350 after data object 'c' 310 has been deleted or moved and then shredded. In the depicted embodiment, the object headers 302 for data object 'a' 306 and 'b' 308 remain unchanged. However, the object header 302 for deleted data object 'c' 310 is overwritten with a dummy header 352. In one embodiment, the dummy header 352 may include metadata that indicates that the corresponding data object has been shredded. Additionally, the physical data of data object 'c' 310 may be overwritten with a predetermined bit pattern 354. The bit pattern 354 may be identified in the data destruction policy. For example, the data may be overwritten with all '0's, all '1's, or a predetermined or random pattern of '1's and '0's.

Figure 4:
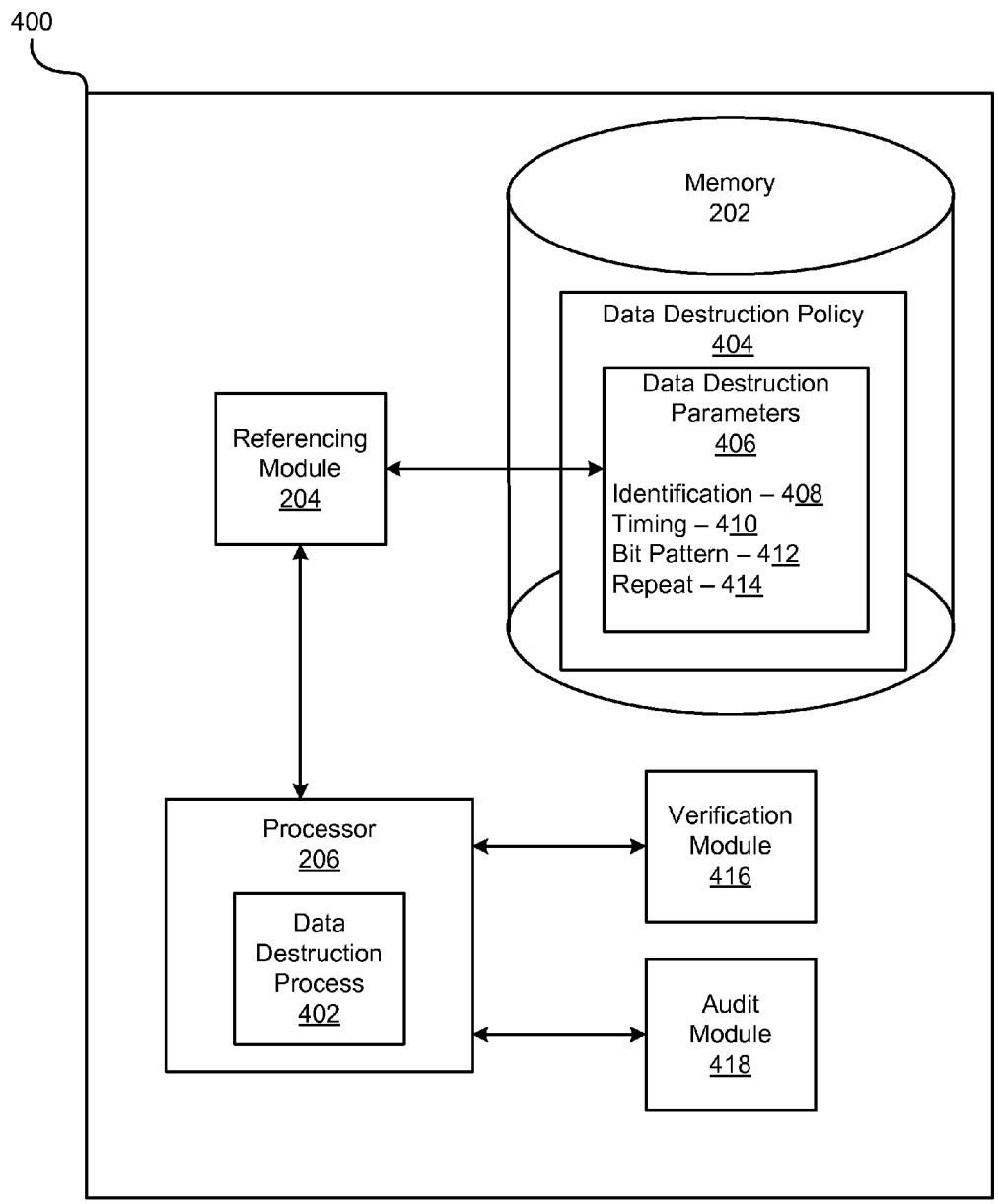
FIG. 4 is a detailed schematic block diagram illustrating another embodiment of an apparatus for policy-based secure data destruction.

FIG. 4 is a detailed schematic block diagram illustrating one embodiment of an apparatus 400 for policy-based secure destruction of data. In one embodiment, the apparatus 400 includes substantially the same modules as described above with relation to FIG. 2. Specifically, the apparatus 400 may include a memory 202, a referencing module 204, and a processor 206. The processor 206 may execute a data destruction process 402. The referencing module 204 may access a data destruction policy 404 stored within the memory 202. The data destruction policy may contain one or more data destruction parameters 406. In a further embodiment, the apparatus 400 may include a validation module 416 and an audit module 418.

In one embodiment, the memory 202 may store a data destruction policy 404. In various embodiments, the memory 202 may store a set of data destruction policies 404, each pertaining to a particular storage device 170 or group of data objects. The data destruction policy 404 may define predetermined data destruction parameters 406. The data destruction parameters may include an identification parameter 408, a timing parameter 410, a bit pattern parameter 412, and a repeat parameter 414. One of ordinary skill in the art will recognize other potentially useful parameters that may be included in data destruction policy 404.

In one embodiment, the identification parameter 408 identifies one or more data objects to be shredded after those objects are logically deleted or moved to another storage location. For example, the identification parameter 408 may identify a specific data object such as a backed up file or database for destruction. Alternatively, the identification parameter 408 may identify a group of data objects for destruction. For example the identification parameter 408 may identify data objects associated with a particular software application for destruction. In an alternative embodiment, the identification parameter 408 may identify a particular storage device 170 selected for data destruction. In such an embodiment, substantially all delete or move operations performed on data objects stored on the identified storage device 170 may be destroyed using a shredding process or the like.

In a certain embodiment the apparatus 400 may detect that a move or delete operation has occurred on the storage server 130. The referencing module 204 may access the data destruction policy 404 to determine if the physical data should be shredded based on the identification parameter 408. In addition, the referencing module 204 may obtain a timing parameter 410 that indicates when the data destruction process 402 should take place. In one embodiment, the apparatus 400 generates a queue element in response to a determination that the data object should be shredded. A background process on the processor 206 may monitor the queue and initiate the data destruction process 402 in accordance with the timing parameter 410. For example, if the timing parameter 410 indicates that the data object should be immediately destroyed, the background process may immediately trigger the data destruction process 402. In a further embodiment, a second background process may monitor a queue of elements scheduled for a batch shredding process 402. In such an embodiment, the timing parameter 410 may include scheduling information for scheduling the destruction of the data object during a future batch destruction process 402. The timing parameter 410 may include a date and time. Alternatively, the timing parameter 410 may define a delay. In one embodiment, if the delay is set to zero, the timing parameter 410 may indicate that the data object should be immediately shredded. The timing parameter 410 may also indicate whether the data object should be automatically shredded or whether the processor 206 should wait for a manual trigger by a system administrator before initiating the data destruction process.

The bit pattern parameter 412 may include information for identifying a predetermined bit pattern for overwriting the data object. For example, the physical data of data object 'c' 310 may be overwritten with a predetermined bit pattern 354. The bit pattern 354 may be identified in the data destruction policy. For example, the data may be overwritten with all '0's, all '1's, or a predetermined or random pattern of '1's and '0's. In one embodiment, the bit pattern parameter 412 may include values to be used in a random pattern generator. In the event that multiple overwrites are required, the bit pattern parameter 412 may identify different patterns to be written on each overwrite pass.

In a further embodiment, the repeat parameter 414 may indicate how many overwrite passes the data destruction process 402 should make. For example, the repeat parameter 414 may be a numerical value indicating that the data destruction process 402 should overwrite the data object with the predetermined bit pattern five times. The repeat parameter 414 may be set to a range of values. In one embodiment, a value of zero in the repeat parameter 414 may indicate that the data object should not be overwritten.

The validation module 416 may be configured to validate a data object prior to destroying the object. For example, the validation module 416 may check header information for data objects selected for destruction and compare the header values with expected header values. In such an embodiment, the validation module 416 may prevent erroneous overwrites. The validation module 416 may contain expected header information. Alternatively, the validation module 416 may obtain expected header values from memory 202 or from the data manager 160 at the time of the move or delete operation.

The apparatus 400 may also include an audit module 418 configured to audit a selected storage volume 170. The storage server 130 may perform audits by storage volume 170. In an alternative embodiment, rather than being performed for a single storage volume 170, the audit could be performed for all data objects stored for one or more clients 110, for all data objects initially stored within a specified date range, for all data objects generated by a specified application, or other criteria. The audit module 418 may determine whether the data destruction policy 404 has been accurately applied. The audit module 418 may accomplish this by comparing values in object headers 302 with expected values. For example, the audit module 418 may audit the storage volume 350 of FIG. 3B to determine whether the physical data corresponding to data object 'c' 310 was accurately shredded. In such an example, the audit module 418 may compare the location and values of the frame headers 304 and object headers 302 with expected values. Specifically, the audit module 418 may check the object header 302 of shredded data object 'c' 310 to see if it has been overwritten with the appropriate dummy header 352. The locations and values of the frame headers 302 and object headers 304 may be stored in the audit module 418 or may be stored on a separate memory 202 or storage server 130. In the event of database damage or regression to an earlier state, the audit module 418 may identify and delete metadata references to data objects that had previously been shredded.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 5:
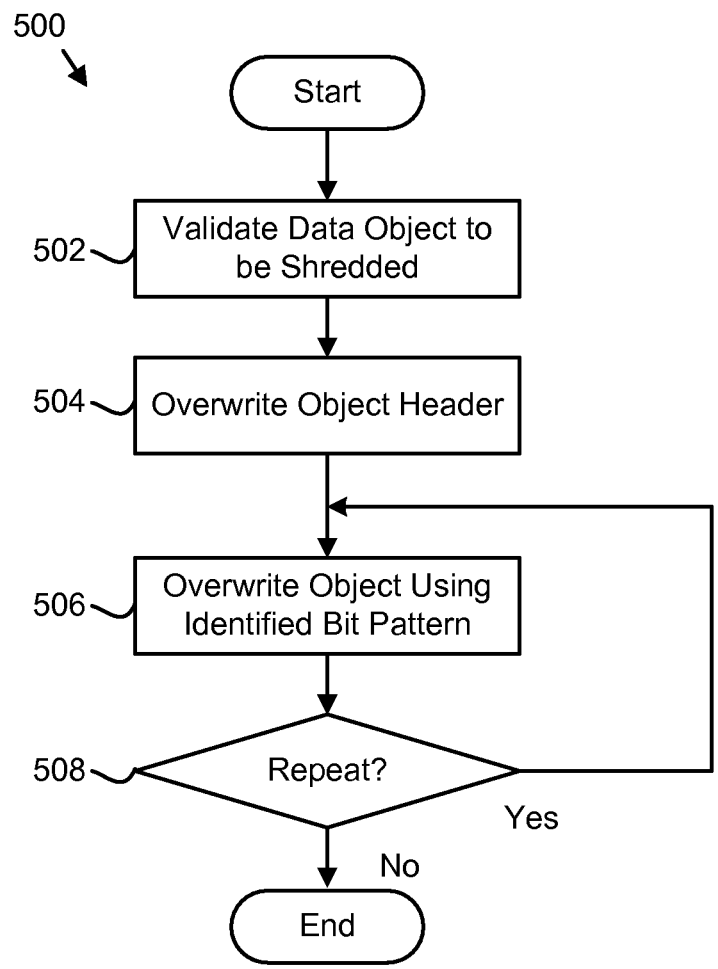
FIG. 5 is a schematic flow chart diagram illustrating one embodiment of a method for secure data destruction.

FIG. 5 is a schematic flow chart diagram illustrating one embodiment of a data destruction process 500. The data destruction process 500 may substantially correspond to the data destruction process 402 performed by the processor 206. In one embodiment, the validation module 416 may validate 502 the data object prior to destroying the data object. Next the processor 206 may overwrite 504 the data object header 302 with a predetermined dummy header 352. The processor 206 may then overwrite 506 the data object in accordance with the data destruction parameters. For example, the processor 206 may overwrite 506 the data object using a bit pattern identified by the bit pattern parameter 412. Then, a determination is made of whether to repeat 508 the overwrite pass. If multiple overwrite passes are required, the data object is overwritten 506 by the processor 206 repeatedly according to the number of repeat passes identified by the repeat parameter 414.

For example, in the storage volume 300, 350 described in FIG. 3A and FIG. 3B, the validation module 416 may check 502 the value of the object header 302 of data object 'c' 310 to ensure that the physical data in the location of data object 'c' 310 corresponds to the data that was logically deleted by the storage server 130. If the header values match, the processor may overwrite the object header 302 corresponding to data object 'c' 310 with the dummy header 352. The processor 206 may then overwrite 506 data object 'c' 310 with a random bit pattern 354 as identified by the bit pattern parameter 412. If it is determined that the overwrite process should repeat 508, the processor 206 may continue to overwrite 506 data object 'c' 310 with bit patterns 354 identified by the bit pattern parameter 412 until the value in the repeat parameter 414 is reached.

Figure 6:
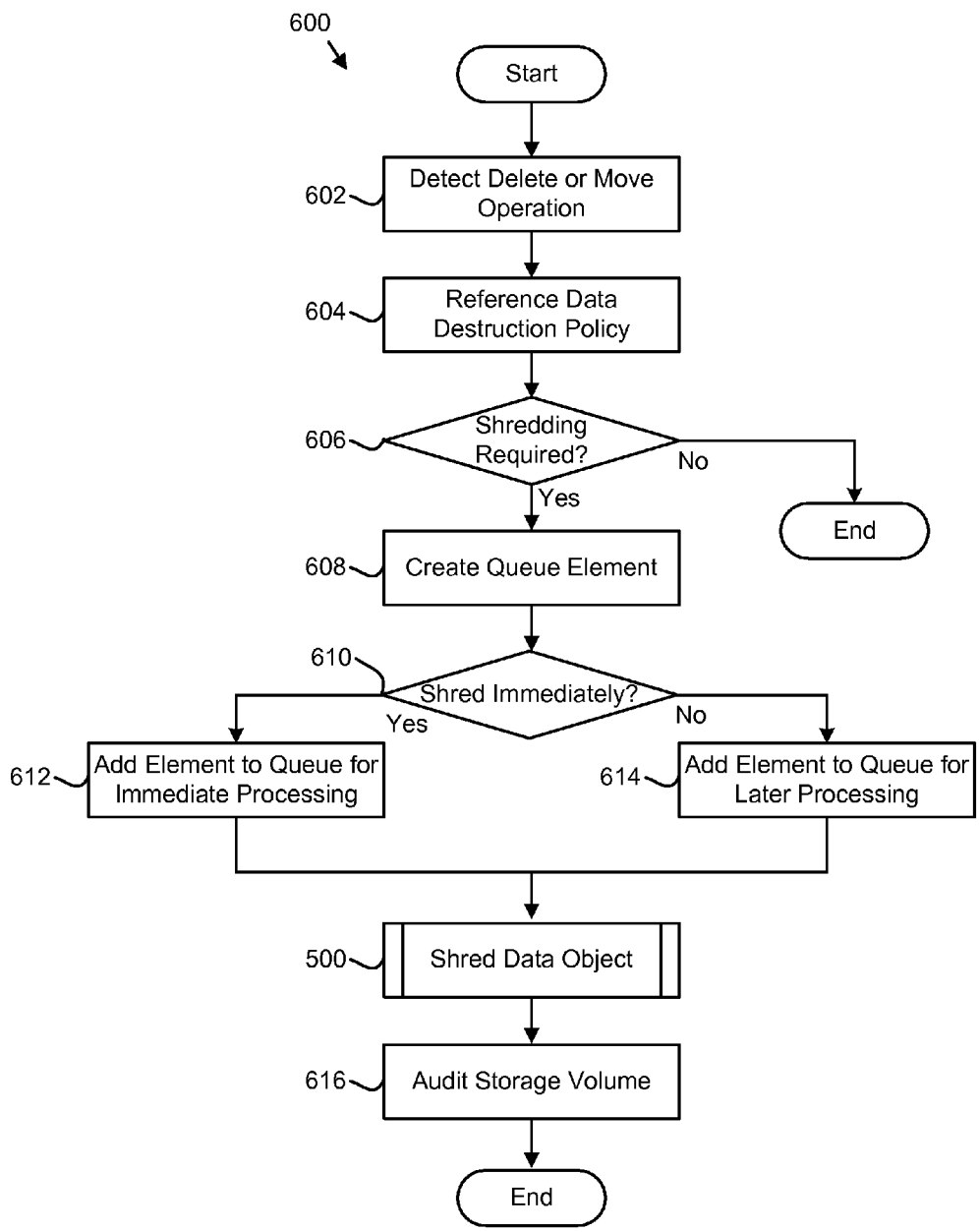
FIG. 6 is a schematic flow chart diagram illustrating one embodiment of a method for policy-based secure data destruction.

FIG. 6 is a detailed flow chart diagram illustrating one embodiment of a method 600 for policy-based secure destruction of data. In one embodiment, the apparatus 200 detects 602 a delete or move operation performed by the storage manager 160. The referencing module 204 may then reference 604 a data destruction policy 404 stored in memory 202. If the identification parameter 408 of the data destruction policy 404 indicates 606 that data shredding is required 606 for the identified data object, a queue element may be generated for the data destruction process 402. If no shredding is required 606, the process ends. If it is determined 610 from the timing parameter 410 that the shred process should be carried out immediately, the queue element may be added 612 to a queue for immediate and automatic processing. Otherwise, the queue element may be added 614 to a separate queue for manual or scheduled processing. A background process may monitor the queues. The background process may trigger a data destruction process 402. The data object may then be shredded 500 according to the method described above with relation to FIG. 5. In one embodiment, the audit module 418 may perform an audit 616 of the storage volume 170 to verify that the data destruction process 402 has accurately applied the data destruction policy 404. The storage volume 170 may be audited 616 for each shredding event, or may be audited as a batch audit at a later time.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed is:

1. A method for policy-based secure destruction of data, the method comprising:
    storing a data destruction policy, wherein the data destruction policy defines at least one predetermined data destruction parameter, wherein the data destruction policy pertains to a particular storage device;
    referencing the data destruction policy to obtain the at least one predetermined data destruction parameter in response to a predetermined data operation;
    identifying an entire stored data object to be destroyed based on the data destruction policy in response to the predetermined data operation, the entire stored data object associated with a stored object header; and
    executing a data destruction process of the entire stored data object in accordance with the at least one data destruction parameter, wherein the data destruction process comprises overwriting the entire stored data object with a predetermined and random bit pattern, checking a value of the object header to ensure that physical data in a location of the entire stored data object corresponds to the overwritten entire stored data object, and overwriting the stored object header associated with the entire stored data object with a dummy header in response to validating the value of the object header, the dummy header comprising metadata indicating that the entire stored data object has been destroyed by the data destruction process, the dummy header further comprising metadata indicating the bit pattern used by the data destruction process to destroy the entire stored data object, wherein the entire stored data object is unusable; and
    auditing a selected storage volume to determine whether the data destruction policy has been accurately applied, the selected storage volume comprising the entire stored data object, wherein auditing includes determining whether the stored object header has been overwritten with the dummy header.

2. The method of claim 1, wherein the data destruction policy further comprises an identification parameter for identifying the stored data object selected for destruction.

3. The method of claim 1, wherein the data destruction policy further comprises a timing parameter for determining when the data destruction process is to initiate.

4. The method of claim 1, wherein the data destruction policy further comprises a bit pattern parameter for determining the predetermined and random bit pattern to be utilized by the data destruction process, the method further comprising overwriting the entire stored data object with a first bit pattern based on a first value for the bit pattern parameter and overwriting a second entire stored data object with a second bit pattern based on a second value for the bit pattern parameter.

5. The method of claim 1, wherein the data destruction policy further comprises a repeat parameter indicating a predetermined number of times the data destruction process overwrites the entire stored data object, the data destruction process comprising overwriting the entire stored data object a first predetermined number of times according to a first value for the repeat parameter and overwriting a second entire stored data object a second predetermined number of times according to a second value for the repeat parameter.

6. The method of claim 1, wherein the data destruction process further comprises validating the entire stored data object prior to destroying the entire stored data object, wherein validating comprises comparing the value of the stored object header of the entire stored data object with an expected data object header value.

7. The method of claim 6, wherein the data destruction process further comprises repeating the overwrite of the entire stored data object in accordance with the data destruction parameter.

8. A system for policy-based secure destruction of data, the system comprising:
    a storage server configured to:
        store a data destruction policy, wherein the data destruction policy defines at least one predetermined data destruction parameter, wherein the data destruction policy pertains to a particular storage device;
        reference the data destruction policy to obtain the at least one data destruction parameter in response to a predetermined data operation, the at least one data destruction parameter specifying at least how the stored data is to be destroyed according to one of a plurality of data destruction protocols in response to the predetermined data operation;
        identify an entire data object to be destroyed based on the data destruction policy in response to the predetermined data operation, the entire stored data object associated with a stored object header; and
        execute a data destruction process of the entire stored data object in accordance with the at least one data destruction parameter, wherein the data destruction process comprises overwriting the entire stored data object with a predetermined and random bit pattern, checking a value of the object header to ensure that physical data in a location of the entire stored data object corresponds to the overwritten entire stored data object, and overwriting the stored object header associated with the entire stored data object with a dummy header in response to validating the value of the object header, the dummy header comprising metadata indicating that the stored data object has been destroyed by the data destruction process, the dummy header further comprising metadata indicating the bit pattern used by the data destruction process to destroy the entire stored data object, wherein the entire data object is unusable;

audit a selected storage volume to determine whether the data destruction policy has been accurately applied, the selected storage volume comprising the entire stored data object, wherein auditing includes determining whether the stored object header has been overwritten with the dummy header; and a storage medium in communication with the storage server, configured to store data objects for the storage server.

9. The system of claim 8, wherein the storage manager is further configured to validate the entire stored data object prior to destroying the entire stored data object, wherein validating comprises comparing the value of the stored header of the entire stored data object with an expected data object header value.

10. The system of claim 9, wherein the data destruction process further comprises repeating the overwrite of the entire stored data object in accordance with the data destruction parameters.

11. A computer program product comprising a non-transitory computer useable medium having a computer readable program, wherein the computer readable program when executed on a computer causes the computer to perform operations for policy-based secure destruction of data, the operations comprising:

storing a data destruction policy, wherein the data destruction policy defines at least one predetermined data destruction parameter, wherein the data destruction policy pertains to a particular storage device;

referencing the data destruction policy to obtain the at least one predetermined data destruction parameter in response to a predetermined data operation, the at least one data destruction parameter specifying at least how the stored data is to be destroyed according to one of a plurality of data destruction protocols in response to the predetermined data operation;

identifying an entire stored data object to be destroyed based on the data destruction policy in response to the predetermined data operation, the entire stored data object associated with a stored object header;

executing a data destruction process of the entire stored data object in accordance with the at least one data destruction parameter, wherein the data destruction process comprises overwriting the entire stored data object with a predetermined and random bit pattern, checking a value of the object header to ensure that physical data in a location of the entire stored data object corresponds to the over overwritten entire stored data object, and overwriting the stored object header associated with the entire stored data object with a dummy header, in response to validating the value of the object header, the dummy header comprising metadata indicating that the stored data object has been destroyed by the data destruction process, the dummy header further comprising metadata indicating the bit pattern used by the data destruction process to destroy the entire stored data object; and auditing a selected storage volume to determine whether the data destruction policy has been accurately applied, the selected storage volume comprising the entire stored data object, wherein auditing includes determining whether the stored object header has been overwritten with the dummy header.

12. The computer program product of claim 11, wherein the data destruction process further comprises validating the entire stored data object prior to destroying the entire stored data object, wherein validating comprises comparing the value of the stored header of the entire stored data object with an expected data object header value.

13. The computer program product of claim 12, wherein the data destruction process further comprises repeating the overwrite of the entire stored data object in accordance with the data destruction parameters.

14. An apparatus for policy-based secure destruction of data, the apparatus comprising:

a memory configured to store a data destruction policy, wherein the data destruction policy defines at least one predetermined data destruction parameter, wherein the data destruction policy pertains to a particular storage device;

a referencing module configured to identify an stored entire data object to be destroyed based on the data destruction policy and reference the data destruction policy to obtain the at least one data destruction parameter in response to a predetermined data operation, the at least one data destruction parameter specifying at least how the stored data is to be destroyed according to one of a plurality of data destruction protocols in response to the predetermined data operation;

a processor configured to execute a data destruction process of the entire stored data object in accordance with the at least one data destruction parameter, wherein the data destruction process comprises overwriting the entire stored data object with a predetermined and random bit pattern, checking a value of the object header to ensure that physical data in a location of the entire stored data object corresponds to the overwritten entire stored data object, and overwriting the stored object header associated with the entire stored data object with a dummy header in response to validating the value of the object header, the dummy header comprising metadata indicating that the entire stored data object has been overwritten by the data destruction process, the dummy header further comprising metadata indicating the bit pattern used by the data destruction process to destroy the entire stored data object; and an audit module configured to audit a selected storage volume to determine whether the data destruction policy has been accurately applied, wherein auditing includes determining whether data object header values associated with data objects match expected data object header values.

15. The apparatus of claim 14, further comprising a validation module configured to validate the entire stored data object prior to destroying the entire stored data object, wherein validating comprises comparing the value of the stored header of the entire stored data object with an expected data object header value.

16. The apparatus of claim 15, wherein the data destruction process further comprises repeating the overwrite of the entire stored data object in accordance with the data destruction parameters.

* * * * *